Nov. 12, 1935.  M. J. UDY  2,020,976
PRODUCTION OF PURE PHOSPHORIC ACID
Filed April 11, 1932
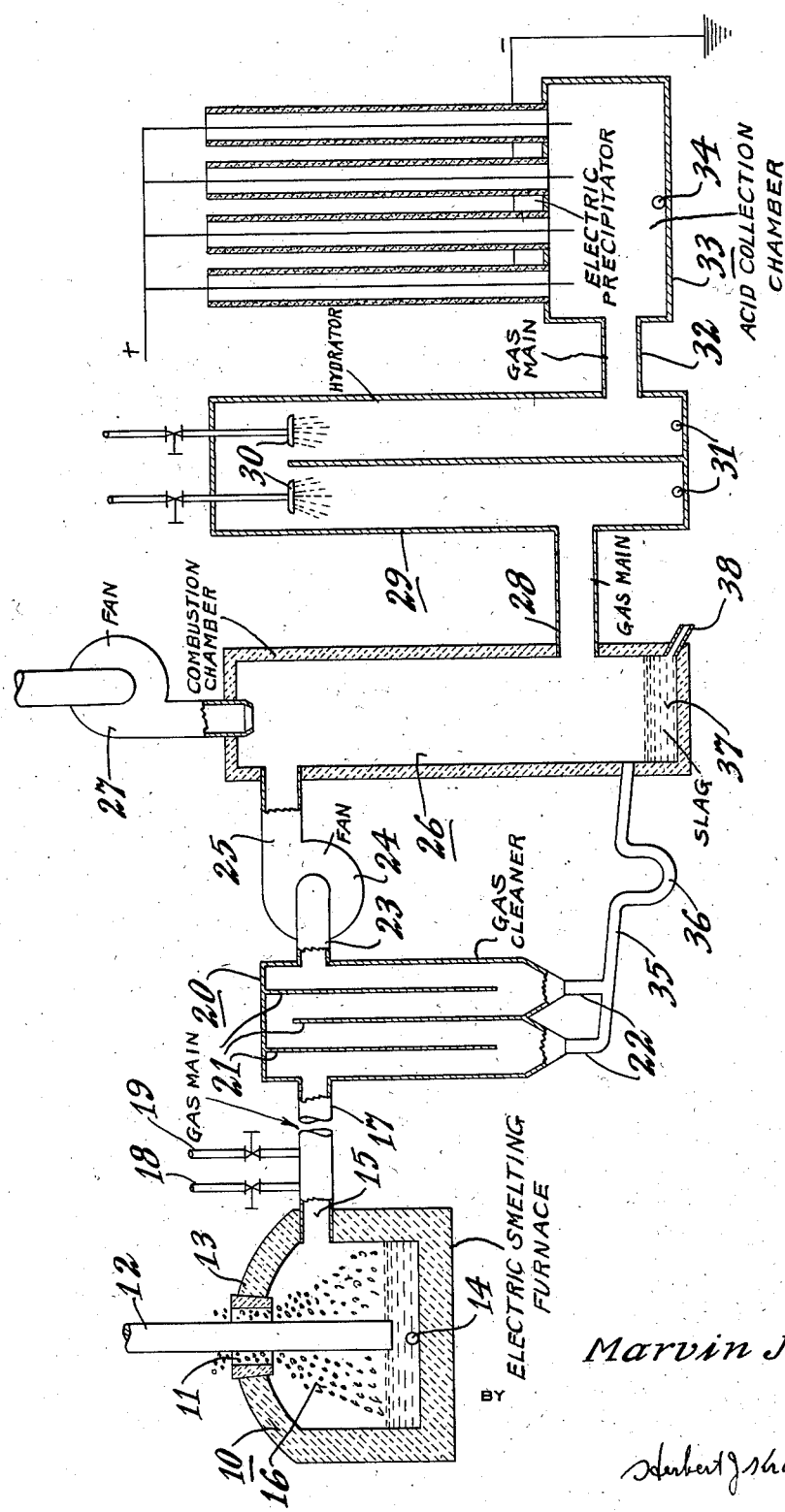
INVENTOR
Marvin J. Udy
BY
Herbert J Chase.
ATTORNEY Patented Nov. 12, 1935

2,020,976

UNITED STATES PATENT OFFICE 2,020,976

PRODUCTION OF PURE PHOSPHORIC ACID

Marvin J. Udy, Anniston, Ala., assignor to Swann Research, Incorporated, a corporation of Alabama Application April 11, 1932, Serial No. 604,443

13 Claims. (Cl. 23—165)

This invention relates to the preparation of phosphoric acid and in particular to methods and apparatus by which this acid may be obtained in extremely pure form.

One object of this invention is the provision of a process for producing pure phosphoric acid in concentrated form. Another object is the provision of apparatus by which my invention may be economically practiced. Another object of my invention is to provide a process for the removal of impurities from the gases of a phosphorus smelting furnace wherein the impurities in said gases are caused to react with a hydrated or partly hydrated phosphorus oxide while in suspension in the gas stream and before complete oxidation and hydration of the main body of the gases, and wherein the reaction product of impurities and phosphorus oxides is collected separately.

In previous methods for the production of phosphoric acid, the gases, produced by the smelting furnace, which consist of phosphorus and carbon monoxide in varying proportions are filtered either through a pebble filter or are cleaned at temperatures above the phosphorus dew point by electrical precipitation. Such methods are difficult of operation, first because of the necessity for continuously cleaning the filter, and secondly because some of the impurities in the phosphorus gases persist as gases even at temperatures at and below the dew point of phosphorus and consequently cannot be removed either by filtration or by electrical precipitation.

It is well known to those skilled in the art that the vapor from phosphorus smelting furnaces contains non-filterable impurities, particularly the halides of the metallic elements such as iron and aluminum or silicon. These impurities persist as gases even after careful filtration at temperatures approximating the condensation temperature of phosphorus.

It has heretofore been proposed to purify phosphorus containing gases by totally condensing the gases by means of a system of baffles on which water is sprayed, the phosphoric acid and impurities formed as a sludge being withdrawn together from the baffle chamber and the acid then separated from the sludge by decantation. It has also been proposed to employ a method in which the phosphorus pentoxide gas from the furnace is scrubbed by a body of phosphoric acid, the impurities forming a sludge or mud which is drawn off from time to time. In both of these processes, there is necessary a subsequent filtration step for the removal of suspended solids from the acid. Such a filtration, however, is ineffective in removing dissolved impurities in the acid, and the methods proposed have not met with commercial favor.

The term "pure phosphoric acid" as employed in this specification is intended to mean an acid containing no more than 0.3% impurities and my process contemplates the production of acid containing as low as 0.01% or lower total impurities. I have found in my research that ordinary concentrated phosphoric acid from which impurities have been removed, either by decantation or filtration or subsequent chemical treatment contains in the neighborhood of 0.50% to 0.35% of combined impurities. In order to prepare acid of the desired or higher degrees of purity, I find it necessary to more thoroughly remove the impurities from the phosphorus containing gases before they are finally oxidized, hydrated and collected.

The impurities usually present in thermally produced phosphoric acid consist of compounds of iron, aluminum, silicon, calcium, lead, arsenic, and various halides, especially fluorine, all in various stages of combination. Impurities such as calcium, lead and arsenic may at present be removed by other methods, however, the iron and aluminum compounds are not at present removed by any known methods. My herein described method, however, removes not only the iron and aluminum compounds, but also the others above enumerated, and hence is effective to produce a purer acid by a much simpler and cheaper operation.

To the accomplishment of the foregoing and related ends, the invention, then, consists in the features hereinafter fully described and particularly pointed out in the claims, the following description, setting forth but one of the various ways in which the principle of the invention may be used.

In accordance with my invention, a small amount of a phosphoric oxide-water reaction product (a phosphoric acid) is dispersed throughout a body of phosphorus gas containing impurities. The above mentioned reaction product, I have found, combines selectively and completely with the impurities present, after which the impurities may be completely removed by merely causing the phosphoric oxide-water reaction product to condense. The phosphorus remaining in the gas or vapor phase may henceforth be collected as such or it may be further oxidized and hydrated and the resulting pure phosphoric acid collected in the usual way.

The phosphoric oxide-water reaction product is undoubtedly a phosphoric acid and very probably a meta or pyro phosphoric acid or a mixture of these. Its exact composition has not yet been definitely determined, however, its mode of formation in a dispersed form within the body of phosphorus containing gas is herein set forth as well as the effect on the purification of these gases.

As illustrative of my invention, reference is made to the drawing, the single figure of which illustrates diagrammatically, one way by which my invention may be carried out.

In said drawing, 10 represents an ordinary electric furnace provided with combined stock and electrode inlet 11, electrode 12, roof 13, tap hole 14, and gas outlet 15. The stock comprising phosphatic ore, carbonaceous material and flux is introduced through the combined inlet 11 and forms a pile 16 within the furnace around the electrode. A gas duct 17 provided with an air inlet pipe 18 and a water inlet pipe 19 connects the gas outlet 15 with the gas cleaning or condensing means 20, the latter being provided with baffles 21 and bottom outlets 22. A conduit 23 connects the gas cleaning means 20 with a blower 24 which discharges through a conduit 25 with an oxidizing chamber 26. A second blower 27 supplies air to the oxidizing chamber. A further connecting duct 28 serves to convey the oxidized gases from 26 into a hydrating and cooling tower 29. The latter is provided with water spray nozzles 30 and weep holes 31. A conduit 32 then conveys the hydrated fumes to an electrical precipitator 33 of the ordinary well known type. An acid outlet 34 is provided for draining off the acid collected therein.

A conduit or conveying means 35 for liquid condensate connects the condenser 20 with the combustion chamber 26. A trap 36 permits the condensate to flow in the desired manner but prevents gases and vapors from travelling in the reverse direction. The condensed acid together with impurities collects in a sump at 37, from which the residue may be removed by means of tap hole 38.

In the operation of my improved process I charge to electric furnace 10 a mixture of phosphate rock, silica, and coke, the proportions employed being those well understood in the art. On application of electrical energy, there is evolved a mixture of gases, comprising essentially phosphorus and carbon monoxide, the gases being generated in the smelting zone of the furnace, rising through the stock and passing out of the furnace by means of opening 15 into duct 17. As ordinarily operated the gases leaving the furnace by means of opening 15 are somewhat in the neighborhood of 400° C., however, because of the intense heat of the smelting zone they carry in addition to the phosphorus and carbon monoxide, impurities such as volatilized silicon, silico-phosphates, iron and aluminum halides together with mechanically suspended dust from the stock in the furnace.

In case the stock charged to the furnace contains only a small amount of water, and if furthermore the furnace is more or less air tight, I have provided inlet pipes 18 and 19 on duct 17 through which regulated amounts of air and water may be added to the gas so that a controlled percentage of phosphoric acid is produced. In most cases the stock charge will carry some water combined with the various ores and it is also known that during operation under reduced pressure a small amount of air will enter the furnace either through imperfect sealing at the stock inlet 11 or through crevices in roof 13. In any event the manipulation of air inlet 18 and water inlet 19 in a manner to be hereinafter more fully described will assist in the efficient practice of my invention.

The furnace gases passing through the duct 17 are somewhat cooled, if necessary, during this passage either by direct radiation or convection from the walls of this duct or by the application of cooling water to the exterior. For this reason the conduit 17 is shown of indeterminate length. In actual practice this conduit is so proportioned that the gases passing through it are cooled by either or both of the methods above described so that the gases entering gas cleaner 20 are cooled to the dew point of the phosphoric oxide-water reaction product. The object of the gas cleaner or condenser 20 will now be seen to be the condensation of the small amount of phosphorus oxide-water reaction product without the condensation of appreciable quantities of phosphorus. The temperature of the condenser 20 is maintained around 300° C. to 250° C., at all events above the condensing temperature of appreciable quantities of phosphorus. This action will therefore be in the nature of a selective condensation, eliminating the impurities by condensation, and permitting the purified phosphorus gases to pass to a separate recovery system. The elimination of the impurities in the phosphorus gases takes place, as I have already mentioned, by reaction between the impurities, either suspended or in gaseous state, and the phosphorus oxide-water reaction product, which I form in controlled amount. One feature of my invention is the production of phosphorus oxide-water reaction product of such composition when combined with the impurities that the product will be sufficiently liquid to flow.

The design of condenser 20 should take into consideration the fact that dispersed phosphoric acid is not readily condensed. By properly proportioning the condenser so that a sufficient number of baffles are provided, and also providing that the gas moves at not too great a velocity, or time rate through the apparatus, one skilled in the art should have no difficulty in designing and operating such a device.

As an alternative, in place of condenser 20, I may employ an electrical precipitator of the Cottrell type. Such a device is particularly adapted for partial condensation for the purpose here considered. Other means of condensation and forms of condensers will undoubtedly occur to those skilled in the art.

The production of a condensate in condenser 20 in liquid form is an important feature of my invention and is achieved either by the proper proportioning of the small amount of air and water admitted by pipes 17 and 18 or by causing the furnace itself to so function as to produce a phosphorus containing gas with the requisite amount of contained phosphorus oxide and water vapor.

Because of the various methods by which my invention may be practiced and the variations of the furnace from time to time, it is difficult to give definite figures for the amount of such contained phosphorus oxide and water necessary for purification of the gases. It is best ascertained by actual trial, which is done by operating the furnace for a time on a definite body of stock and ascertaining whether condenser 20 is producing a liquid condensate. If the condensate produced by the ordinary operation of the furnace is not sufficiently liquid to flow, additional water is introduced by pipe 19 until this desired state is attained. Whether a sufficient amount of liquid condensate for purification is being produced is ascertained by the chemical examination of the phosphoric acid produced at point 34. If it is found that the acid thus produced still contains more impurity than desired, the air and water introduced at points 18 and 19 is gradually increased until the desired low limit of impurities is attained.

In the operation of my process I have obtained a very complete elimination of impurities by so operating the furnace that between 10 and 12 percent of the phosphorus produced is oxidized, hydrated and collected in the condenser 20, while a somewhat less complete elimination of impurities was obtained when from 1 to 2 percent of the phosphorus was thus oxidized, hydrated and collected. It is believed the sufficient purification of phosphorus may be obtained by operating between these limits so that acid made therefrom will conform to the purity standards heretofore set out.

The purified phosphorus gases produced by condenser 20 leave by means of the conduit 23 and enter the fan 24, the purpose of which is to maintain a slight vacuum within the furnace. The fan discharges by means of the conduit 25 into the oxidizing chamber 26 in which the phosphorus and carbon monoxide is burned by means of sufficient auxiliary air introduced by means of the fan 27. During the process of oxidation a considerable amount of heat is obtained by this reaction, and I have discovered that this heat may be effectively utilized for the heating of the phosphoric oxide-water reaction product together with the impurities combined therein. To this end the condensed acid discharged from the outlets 22 is caused to flow by pipe 35 into a sump 37 built into or in close proximity with the oxidizing chamber 26. Under the influence of the high temperatures generated by the combustion of the phosphorus and carbon monoxide the condensed acid is caused to give up any volatile phosphoric oxide or phosphorus, which material is thus recovered. A glassy slag, melting at about 900° C. and comprising the impurities which have been removed from the gas remains behind in the sump 37 and may be tapped out from time to time at the tap hole 38.

The purified phosphorus, now as phosphorus pentoxide fume together with the carbon dioxide leaves combustion chamber 26 by means of conduit 28 passing into the cooling and hydrating chamber 29 where additional water is introduced through the inlets 30 to cool and hydrate the phosphorus pentoxide to phosphoric acid. The small amount of weak phosphoric acid produced during this operation is recovered at the weep holes 31. The hydrated and cooled phosphoric acid fume is now collected by electrical precipitation in the precipitator 33 and recovered at the exit 34.

I may also, by means of the invention herein described, purify the phosphorus gases produced in the fuel fired blast furnace. The principle of operation is entirely analogous to that herein described, due regard being had to the lower percentage of phosphorus in the gases from this furnace.

It will also be appreciated that I may dispense with the further oxidation of the purified phosphorus as described above in the event that I desire to recover phosphorus as such. In such case I merely lead the gases from fan 24 into a water cooled condenser wherein the phosphorus will condense in known manner. In such a case the liquid condensation product obtained in condenser 20 may be disposed of by returning it to the furnace together with the stock at the charging inlet 11.

While I have described a single embodiment of my invention, it will be apparent to those skilled in the art that it is not so limited, but that it is susceptible of various changes and modifications without departing from the spirit thereof, and I desire that only such limitations shall be placed thereupon as may be imposed by the prior art, or as are specifically set forth in the appended claims.

I claim:

1. The process which comprises smelting a phosphatic material, a carbonaceous material and a flux in a furnace under conditions to form a gas comprising phosphorus vapor together with impurities, forming within said gas a dispersed phosphoric oxide-water reaction product by reaction of part of said phosphorus vapor, removing said dispersed phosphoric oxide-water reaction product together with admixed impurities and recovering elemental phosphorus from said vapor.

2. The process of purifying phosphorus and recovering same in elemental form, which comprises providing a phosphorus-bearing gas, oxidizing and hydrating a portion of said phosphorus sufficient when oxidized and hydrated to react with the impurities in said gas, removing said oxidized and hydrated portion together with said impurities and recovering elemental phosphorus from said phosphorus-bearing gas.

3. The process of removing impurities from impure phosphorus-bearing vapor which comprises oxidizing and hydrating a part of said phosphorus, contacting said oxidized and hydrated part with the impure phosphorus-bearing vapor, condensing said oxidized and hydrated phosphorus to form a liquid aqueous condensate, and then removing said condensate from contact with said phosphorus vapor.

4. The process of removing impurities from impure phosphorus-bearing vapor produced by a furnace smelting phosphatic materials, which comprises oxidizing and hydrating a part of said vaporized phosphorus to form a dispersed, aqueous phosphoric acid in said vapor, contacting said dispersed acid with the phosphorus-bearing vapor, condensing said dispersed phosphoric acid to form a liquid aqueous condensate, and then removing said condensate from contact with said phosphorus vapor.

5. The process of removing impurities from impure phosphorus-bearing gas as produced by a furnace smelting phosphatic materials, which comprises oxidizing and hydrating a part of said vaporized phosphorus to form a dispersed aqueous phosphoric acid in said vapor, contacting said dispersed aqueous phosphoric acid with said impure phosphorus-bearing vapor, condensing said aqueous phosphoric acid together with said impurities as a liquid aqueous condensate, and removing same from contact with said phosphorus vapors.

6. In the process of producing pure phosphoric acid by oxidation of phosphorus-bearing gases containing impurities, the step which comprises oxidizing and hydrating a part of said phosphorus, contacting said oxidized and hydrated phosphorus with said phosphorus-bearing gases, condensing said oxidized and hydrated phosphorus to form a flowable condensate containing impurities, and then subjecting said condensate to the heat of oxidation of phosphorus.

7. The process of producing pure phosphoric acid which comprises smelting a furnace burden of phosphatic material under conditions to produce a volatile product comprising phosphorus, phosphoric acid and impurities, condensing said phosphoric acid together with said impurities and subjecting said condensed phosphoric acid and impurities to heat, to form a fusible slag therefrom.

8. In the process of producing phosphoric acid by smelting a furnace burden of phosphatic material under conditions to produce a volatile product comprising phosphorus, phosphoric acid and impurities, the steps of collecting said phosphoric acid as a condensate containing said impurities, oxidizing said phosphorus with the evolution of heat, hydrating and collecting said oxidized and hydrated phosphorus as phosphoric acid, and subjecting the first formed phosphoric acid condensate carrying impurities to the heat evolved by the oxidation of said phosphorus.

9. The process of producing phosphoric acid which comprises smelting a furnace burden of phosphatic material under conditions to produce volatile products containing a major proportion of phosphorus and a minor proportion of phosphoric acid together with impurities, condensing said minor proportion of phosphoric acid together with said impurities as an aqueous condensate, oxidizing said major proportion of phosphorus and subjecting said aqueous condensate to the heat liberated by the oxidation of said major proportion of phosphorus, and recovering phosphoric acid from the oxidation products of said phosphorus.

10. In a process of thermal decomposition of phosphate rock in which elemental phosphorus in vapor form together with impurities is evolved, the method of removing impurities from the vapors which comprises absorbing said impurities from a body of said vapors in an hydrated reaction product of phosphorus oxide, and separating said absorbent with impurities from the purified phosphorus.

11. In a process of thermal decomposition of phosphate rock in which elemental phosphorus in vapor form together with impurities is evolved, the method of removing impurities from the vapors which comprises oxidizing and hydrating a minor portion of said evolved vapors and condensing and precipitating the oxidized and hydrated product in the presence of a larger portion of said impure phosphorus vapor.

12. A process of purifying phosphorus, comprising treating phosphorus-bearing vapor, containing impurities evolved from thermal decomposition of phosphate rock, by providing in said impure phosphorus vapor phosphoric oxide-water reaction product in dispersed form to absorb said impurities, and removing from the phosphorus vapor said oxidized and hydrated portion together with absorbed impurities.

13. A process of purifying phosphorus, comprising treating phosphorus-bearing vapor, containing impurities evolved from thermal decomposition of phosphate rock, by providing in said impure phosphorus vapor substantially one to twelve percent of phosphoric oxide-water reaction product in dispersed form to absorb said impurities, and removing from the phosphorus vapor said oxidized and hydrated portion together with absorbed impurities.

MARVIN J. UDY